United States Patent

Gohara et al.

[11] Patent Number: 5,824,141
[45] Date of Patent: *Oct. 20, 1998

[54] APPARATUS FOR MIXING A TANK AND IMPROVING AIR/LIQUID CONTACT IN AN OXIDIZED SYSTEM

[75] Inventors: Wadie F. Gohara, Barberton; Kevin J. Rogers, Wadsworth; Fred C. Owens, II, North Canton; Steven Feeney, Norton, all of Ohio

[73] Assignee: The Babcock & Wilcox Company, New Orleans, La.

[ * ] Notice: The term of this patent shall not extend beyond the expiration date of Pat. No. 5,676,716.

[21] Appl. No.: 869,188

[22] Filed: Jun. 4, 1997

Related U.S. Application Data

[62] Division of Ser. No. 550,438, Oct. 30, 1995, Pat. No. 5,676,716.

[51] Int. Cl.[6] .................................................... B01D 47/06
[52] U.S. Cl. ........................................ 96/235; 261/DIG. 9
[58] Field of Search ......................... 55/228, 229; 95/187, 95/197, 195; 261/36.1, 122, 124, DIG. 9; 210/220, 221.1, 221.2; 422/231

[56] References Cited

U.S. PATENT DOCUMENTS

| 3,789,109 | 1/1974 | Lyon et al. | 55/228 X |
|---|---|---|---|
| 4,047,891 | 9/1977 | Schuetz | 55/228 X |
| 4,427,553 | 1/1984 | Fore | 55/228 X |
| 4,515,754 | 5/1985 | Stehning | 261/DIG. 9 |
| 5,308,509 | 5/1994 | Bhat et al. | 55/228 X |
| 5,540,760 | 7/1996 | Risse et al. | 95/195 |
| 5,676,716 | 10/1997 | Gohara et al. | 95/187 X |

*Primary Examiner*—Richard L. Chiesa
*Attorney, Agent, or Firm*—Daniel S. Kalka; Robert J. Edwards

[57] ABSTRACT

An apparatus to mix a slurry mixture with an oxidization air within a reaction tank of a wet scrubber spray tower of a flue gas desulfurization system for a furnace. The apparatus improves the contact between forced oxidization air and slurry mixture within the reaction tank.

7 Claims, 5 Drawing Sheets

APPARATUS FOR MIXING A TANK AND IMPROVING AIR/LIQUID CONTACT IN AN OXIDIZED SYSTEM

This is a divisional of application Ser. No. 08/550,438 filed Oct. 30, 1995, now U.S. Pat. No. 5,676,716.

BACKGROUND OF THE INVENTION

1. Field of the Invention

The present invention relates generally to desulfurization of flue gases ignited in a furnace and in particular to the forced oxidization of slurry in a wet scrubber spray tower.

2. Description of the Related Art

Currently, wet scrubber spray tower systems are commonly used for flue gas desulfurization. The flue gas desulfurization is accomplished by passing the warm flue gas through a tower with a large tank at its base holding a slurry mixture. The slurry mixture is continuously pumped to the top of the tower to sprayers which distribute the slurry mixture in the top of the tower which the flue gas passes through. The flue gas comes in contact with the slurry mixture, and as a result, a large percentage of the sulfur is removed from the flue gas.

It is beneficial to the process to add pure oxygen or oxygen from air to the slurry mixture while it is in the tank at the bottom of the spray tower. One method of accomplishing this involves forcing oxygen through sparge pipes for bubbling oxygen through the slurry. However, this provides adequate oxidization of the slurry by itself. The slurry above the sparge pipe is agitated and mixed vigorously by the bubbled air. However, below the sparge pipe there is not enough adequate mixing to insure uniformity of the tank's slurry solid content. The slurry must be agitated or mixed in order to thoroughly reoxidize all of the slurry mixture within the tank.

Currently, tank mixing in flue gas desulfurization systems is accomplished using top or side entry mixers. Top entry mixers require large size mixers and shafts to withstand the torques and forces applied to the mixer shaft by the slurry. The shafts are long to achieve thorough mixing, especially in a deep tank. The mixer motor is located above the tank and the mixer shaft entry into the tank is above the slurry mixture level and therefore, a tight seal is not required around the shaft.

Side entry mixers do not require large mixing blades or long shafts because they are usually placed near the base of the tank. However, side entry mixers require seals around the shafts to prevent leakage of the slurry through the mixer shaft opening. Motors for these mixers are often ground mounted because hanging the motors on the tank side wall would require additional wall stiffening to protect against damage from stresses on the tank walls due to vibration from the motors.

Side entry mixers have the problem that misalignment of the mixer shaft can lead to damage of the seal, thereby causing leakage from the tank. A common problem with both types of mixer is the wear on the moving parts and damage to the mixer blades, alteration of the mixing patterns, predicted by numerical modeling, by the action of the recirculation pumps suction and gas flow pattern above the liquid.

Many of the problems discussed above can be avoided if the mixing is achieved without requiring moving parts to penetrate the tank walls and influence tank mixing from within the center of the liquid in the tank.

SUMMARY OF THE INVENTION

It is a primary object of the present invention to address the problems stated above, without reducing the effectiveness of the mixing device.

Accordingly, an apparatus and method for thoroughly mixing the contents of a tank without using moving parts is provided. Means for removing some of the liquid from the bottom of the tank, near its center, is combined with means for providing the liquid to a plurality of conduits which enter the tank at a plurality of openings. The openings are circumferentially and vertically spaced relative to each other between a lower end of the tank and a minimum liquid level of the tank.

At each of the openings on the tank where the liquid is provided, the stream of liquid through the opening has a tangential and downward component relative to the wall of the tank. Additionally, the openings are preferentially placed between the oxidization air sparge tubes and the minimum liquid level of the tank. The direction of introducing the liquid into the tank agrees with the right hand rule governing swirl of liquids above and below the equator. The intent is to enhance the effect of the suction whirlpool by superimposing the tangential motion with the natural forces. A whirlpool effect is created as the liquid removal means causes the liquid to flow vertically down and the tangentially supplied liquid causes the liquid in the tank to rotate in the same direction that the liquid is supplied.

This invention takes advantage of the dynamic energy of the liquid to enhance and propagate mixing in the tank and combines mechanical energy to enhance the whirlpool effect created by the natural physical forces. A sump can be used to pump the liquid from the center of the tank bottom. In deep tanks where the oxidization air sparge pipes are located higher than 4 feet above the tank floors, the sump intake is located near the tank floor under the header approximately two feet above the floor. The intake opening is preferentially at the center of the tank and faces the tank floor to sweep solids laying or accumulating on the tank floor. Most of the deposited solids are gypsum which when recirculated to the oxidation air injection zone acts as a seed for newly formed gypsum crystals, promotes crystal growth and enhances the oxidation process.

The pump discharge is preferentially split into multiple pipes equal in area to that of the main discharge pipe. The multiple pipes re-enter the tank tangentially below the tank's minimum liquid level. Two types of entry are envisioned. In the first, all three pipes enter at the same horizontal level and distribute above the tank circumference 3 feet below the minimum tank operating level. In the second embodiment, the entry points are staggered vertically at three levels, the highest of which is located 3 feet below the tank minimum liquid level and the lowest of which is 3 feet above the oxidization air sparge tubes.

In a shallow tank the oxidization air sparge tubes are located on the tank floor and either form an open ring within the tank or are spread across the tank floor parallel to each other. The air holes of the sparge tubes are located on the top rather than on the sides or bottom of the sparge tubes.

For use in shallow tanks, an area in the center of the tank approximately equal to three times the diameter of the sump intake must be void of the oxidation air sparge tubes. The sump intake is located substantially in the center of this void and runs through the open side of the open circular ring of sparge pipes through the tank wall. The liquid which is removed through the sump can then be provided to the tank through the conduits.

It is a further object of this invention to provide a method for mixing the liquid and solids in a tank with oxidization air provided. Accordingly, there is provided steps for removing liquid from the bottom region of the tank, and providing liquid to the tank through supply tube conduits in a direction having a tangential component for causing the liquid in the tank to move in a rotating mixing motion compatible and complimentary to the natural swirl of the tank predicted by the right hand rule.

An advantage of this invention is that the large particle solids which have settled from the slurry toward the bottom of the tank will be recirculated throughout the liquid in other parts of the tank, thus further improving the overall oxidization of the liquid in the tank and providing seeds for new crystal formation. Additionally, the liquid supply conduits may be located at varying vertical levels with respect to each other. This will initiate a downward rotational mixing at each of the different vertical levels, in contrast to mixing systems which are currently utilized, which traditionally initiate mixing only at a single elevation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
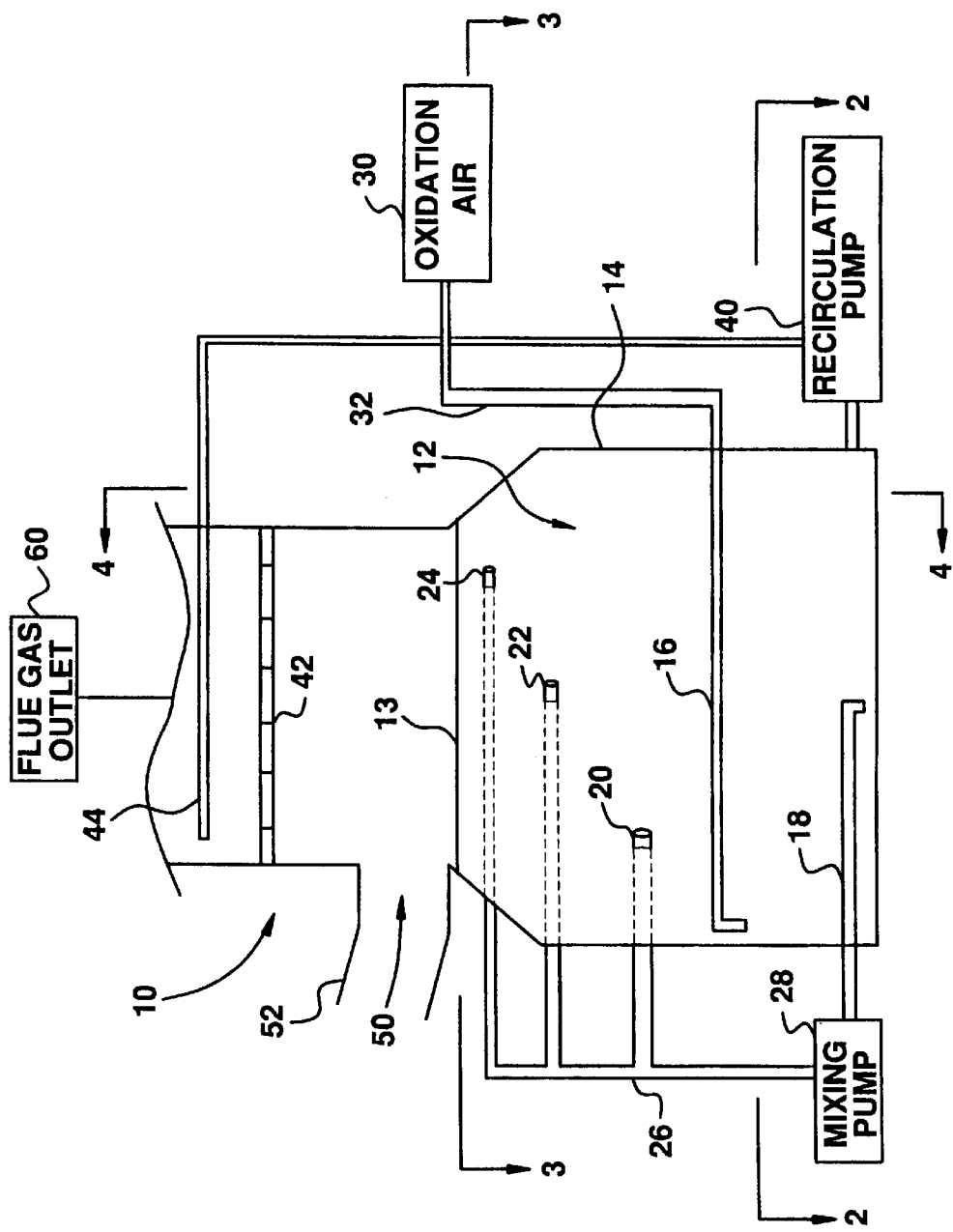
FIG. 1 is a vertical sectional plan view of the present invention.

Referring to the drawings in particular, in FIG. 1 a wet scrubber spray tower generally designated 10 is shown. The spray tower 10 has a reaction tank 14 at its base with flue gas inlet 52 on one side of the tower 10 and the tower 10 terminates in flue gas outlet 60. Inside the spray tower 10 is at least one tray 42 and preferably a plurality of trays and slurry spray tubes 44.

Within the reaction tank 14 portion of the spray tower 10 are oxidization air sparge pipes 16 and sump intake 18. Oxidization air sparge pipes 16 are connected via oxidization air header 32 to oxidization air source 30 located outside reaction tank 14.

Sump intake 18 is connected to mixing pump 28 located outside reaction tank 14. Mixing pump 28 is connected to discharge header 26.

Discharge header 26 has first discharge pipe 20, second discharge pipe 22 and third discharge pipe 24 all connected at one end to header 26. A second end of each of the discharge pipes 20, 22, 24 protrude through the side wall of reaction tank 14 in a direction having a tangential and downward component relative to the side wall of the tank. The discharge pipes 20, 22, 24 are preferentially located between slurry mixture minimum level 13 and oxidization sparge pipes 16.

The slurry mixture 12 in the reaction tank 14 is used in the following manner. Recirculation pump 40 extracts slurry mixture 12 from tank 14 and provides it to slurry spray tubes 44 which distribute the slurry mixture in the upper regions of the spray tower 10 over tray 42. The slurry mixture 12 which is distributed in the spray tower 10 comes in contact with the hot flue gas 50 which is provided through flue gas inlet 52 and naturally rises through spray tower 10.

In a forced oxidization system as shown in FIG. 1, oxidization air source 30 provides oxidization air through oxidization air header 32 and oxidization sparge pipes 16. Oxidization air is bubbled into the slurry mixture 12 located within the tank 14. The slurry mixture 12 must be agitated in order to thoroughly mix the slurry mixture 12 with the oxidization air provided through sparge pipe 16.

A portion of the slurry mixture 12 is withdrawn from the tank through sump intake 18, which is preferentially located in the center of reaction tank 14 approximately 2 feet above the bottom of the tank when oxidization air sparge pipes 16 are more than 4 feet above the floor tank. The slurry mixture 12 withdrawn by mixing pump 28 is provided to the discharge header 26 and then passes to discharge pipes 20, 22, 24. The slurry 12 is then discharged into the reaction tank 14 at points which are circumferentially and vertically spaced apart from each other in directions which have downward tangential components relative to the side walls of the reaction tank 14. This downward tangential component of the discharge from the discharge pipes 20, 22, 24 causes the slurry mixture 12 to rotate within the reaction tank 14 and to mix more thoroughly with the oxidization air released into the tank 14 through sparge pipes 16 and magnifying the downward drag forces on the bubbles rising through the liquid, thus, increasing the contact time between the bubbles and the liquid phase.

Figure 2:
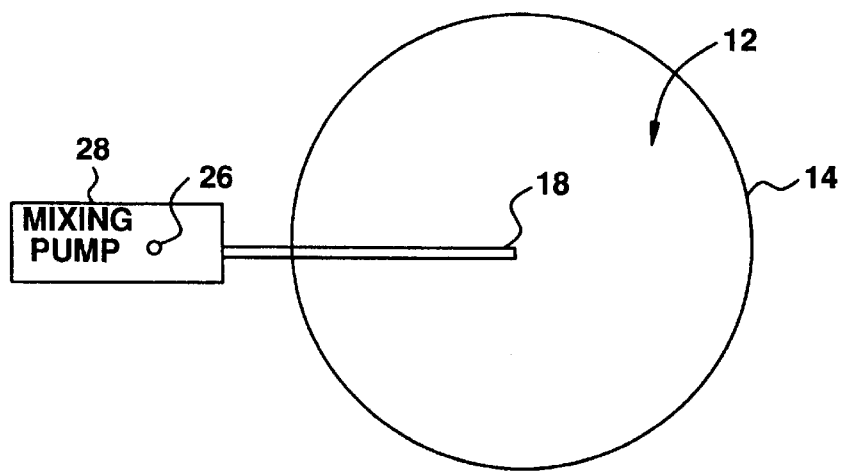
FIG. 2 is a sectional view taken along line 2—2 of FIG. 1.

In FIG. 2, the bottom region of the tank 14 is shown. Slurry mixture 12 is present within the tank surrounding sump intake 18, which is shown located at approximately the center of tank 14. The sump intake 18 is connected to mixing pump 28 which has discharge header 26 connected to it also.

Figure 3:
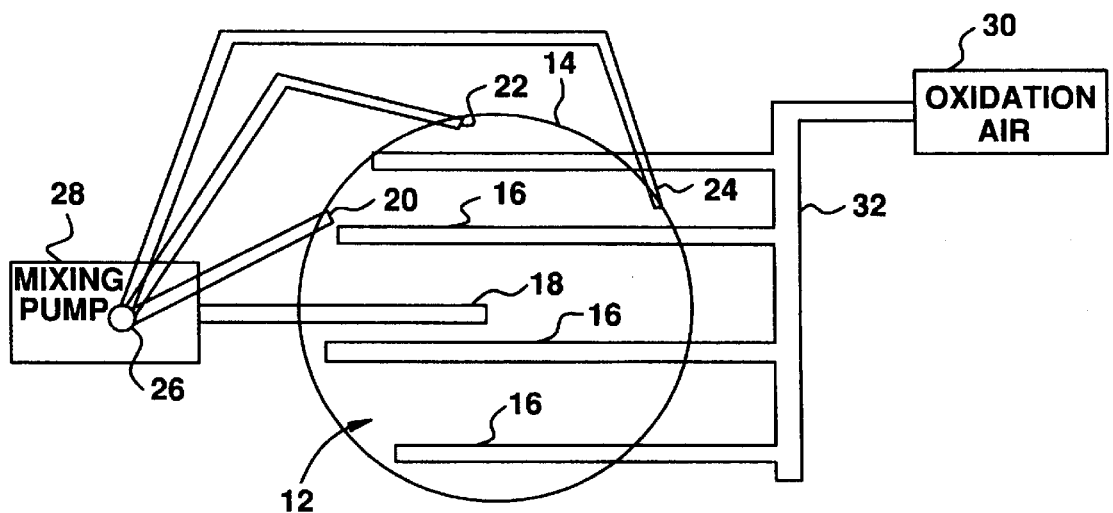
FIG. 3 is a sectional view taken along line 3—3 of FIG. 1.

In FIG. 3, a preferred embodiment for the discharge pipes 20, 22, 24 is shown more clearly. The discharge pipes 20, 22, 24 are shown spaced around the circumference of the tank 14 in relation to each other in order to promote more vigorous mixing of slurry mixture 12. The tangential orientation of the discharge pipes 20, 22, 24 is also shown. The discharge pipes are 20, 22, 24 are shown connected to discharge header 26 which is attached to mixing pump 28. Sump intake 18 is shown connected to mixing pump 28 and protruding into tank 14. Oxidization air source 30 and oxidization air header 32 are connected to four oxidization air sparge pipes 16.

It should be noted that the particular number of sparge pipes 16 which are shown is not intended to be limiting on the scope of this invention nor is the particular number of discharge pipes 20, 22, 24 shown intended to limit the scope of the invention either. In both cases, a fewer or greater number of discharge pipes or sparge pipes could be utilized and still remain within the scope of the present invention.

Figure 4:
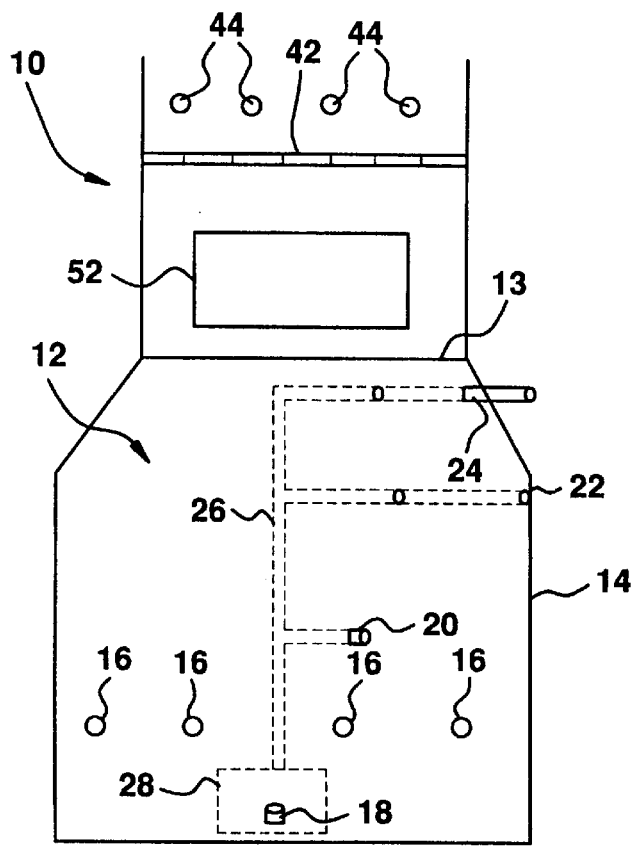
FIG. 4 is a sectional view taken along line 4—4 of FIG. 1.

Turning now to FIG. 4, the vertical spacing of the discharge tubes 20, 22, 24 is shown more clearly. The discharge pipes 20, 22, 24 extend from discharge header 26, circumferentially around tank 14 at differing vertical spacing. The discharge pipes 20, 22, 24 are preferentially located between minimum fluid slurry level 13 and sparge pipes 16. Flue gas inlet 52, tray 42 and slurry spray tubes 44 are located in the upper section of spray tower 10. Near the bottom of reaction tank 14, sparge tubes 16, sump inlet 18 and mixture pump 28 are shown.

Figure 5:
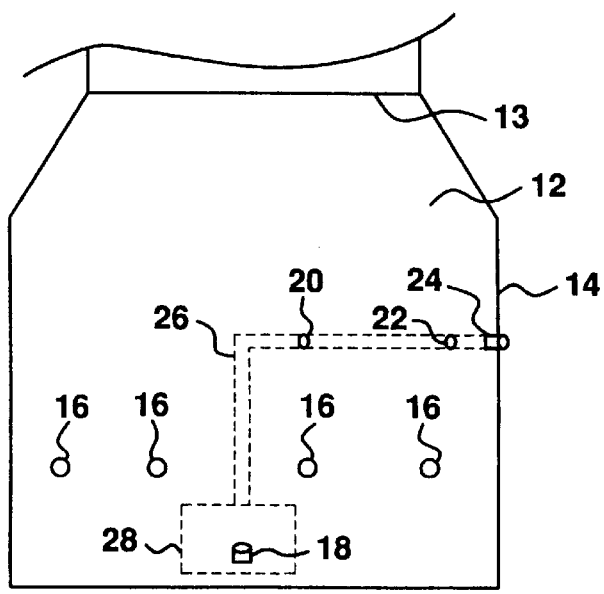
FIG. 5 is a partial vertical sectional view of a second embodiment of the present invention.

FIG. 5 shows a second embodiment of the invention in which the discharge tubes 20, 22, 24 are circumferentially spaced around tank 14 at the same vertical level. The discharge tubes 20, 22, 24 enter tank 14 between air sparge tubes 16 and minimum liquid level 13. Mixture pump 28 and sump inlet 18 are located at the lower end of tank 14, and provide slurry mixture 12 to discharge header 26. Discharge header 26 supplies each of discharge tubes 20, 22, 24 with slurry mixture 12 for reintroduction to the tank 14. The discharge tubes 20, 22, 24 enter the tank 14 at an angle having a downward tangential component relative to the side wall of the tank 14. The slurry mixture 12 reentering the tank 14 mixes with the contents of the tank in a rotational motion.

Figure 6:
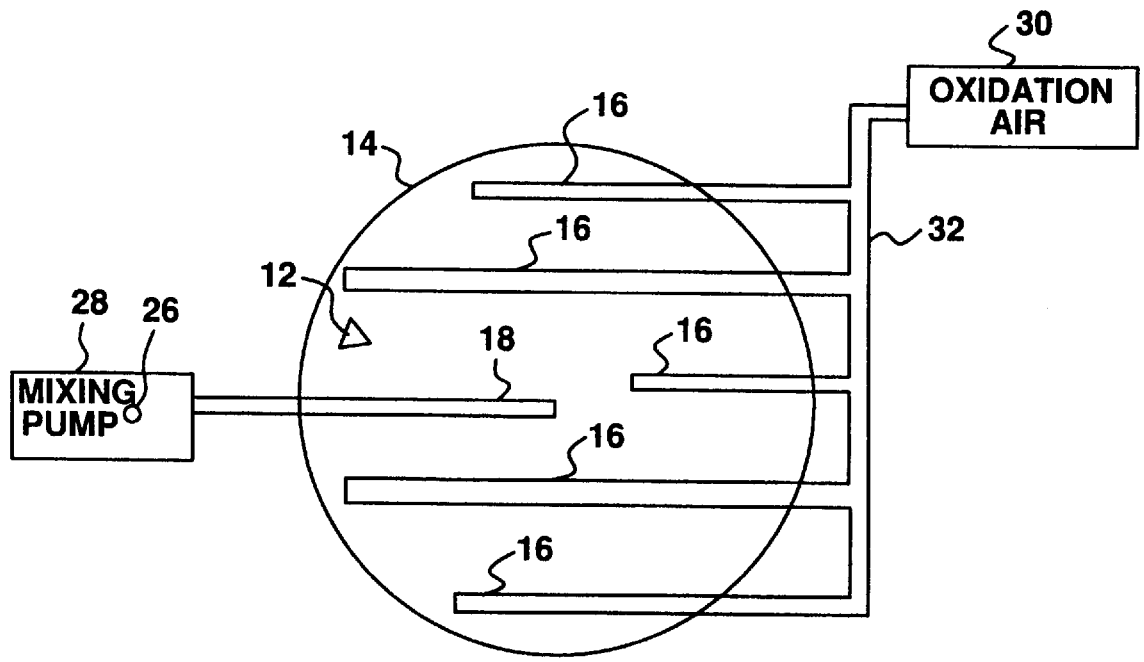
FIG. 6 is a horizontal sectional view of a third embodiment of the invention.
Figure 7:
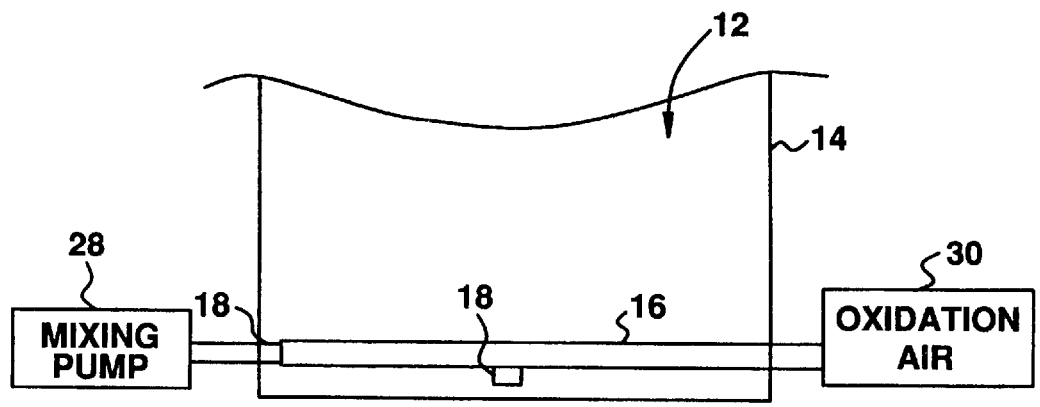
FIG. 7 is a partial vertical sectional view of the embodiment shown in FIG. 6.
Figure 8:
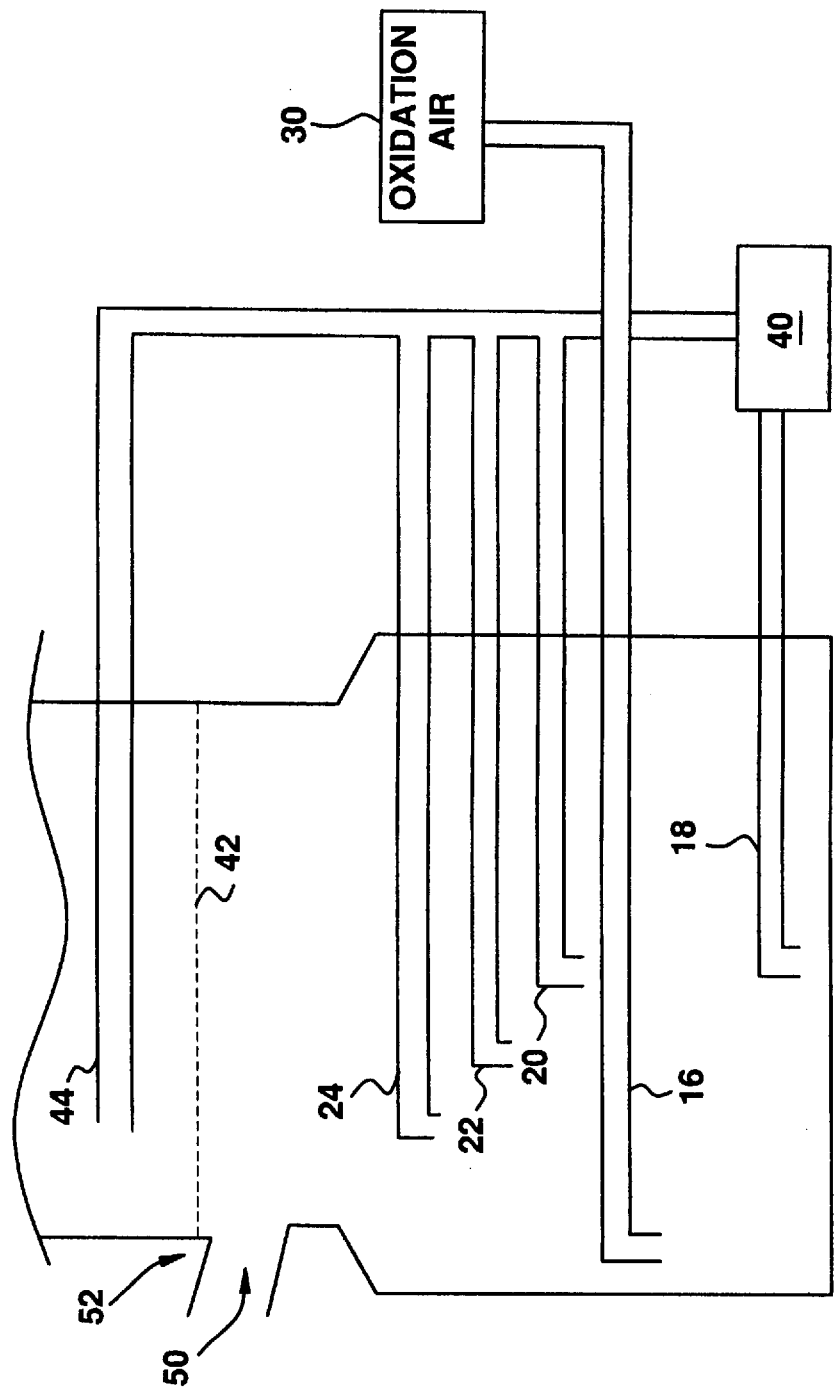
FIG. 8 is a horizontal sectional view of a fourth embodiment of the present invention.

FIGS. 6 and 7 show a third embodiment of the present invention for use in reaction tanks which are relatively shallow. In such cases, the oxidization air provided by an oxidization air source 30 through oxidization air header 32 to sparge tubes 16 is traditionally placed along the bottom of reaction tank 14. In such a case, it is not possible to place sump inlet 18 below sparge tubes 16. Instead, the inlet 18 is located substantially in the same plane as sparge tubes 16 (as shown is FIG. 6). In order to prevent sparge tubes 16 from interfering with the operation of sump intake 18 and mixing pump 28, a void region is created around sump intake 18 which is substantially equal to three times the diameter of sump intake 18. In this area of the tank 14, there are no sparge tubes 16 provided. The discharge tubes 20, 22, 24 (not shown in FIGS. 5 and 6) are connected to discharge header 26 in a manner similar to that disclosed above. In other respects, this embodiment is much like that disclosed in FIGS. 1–4.

A fourth embodiment of the present invention may utilize a split stream of recirculation pumps (40) to perform the function of mixing pump (28). The split stream connects to header (26) which in turn connects to discharge pipes 20, 22, 24.

While specific embodiments of the invention have been shown and described in detail to illustrate the application of the principles of the invention, it will be understood that the invention may be embodied otherwise without departing from such principles.

What is claimed is:

1. An apparatus for use in a flue gas desulfurization system for a furnace for mixing oxidization air with a liquid in a tank having a side wall, upper end, lower end, and a minimum liquid level, the apparatus comprising:

means for removing the liquid from the tank at a point adjacent the lower end of the tank;

means for supplying oxidization air to the tank adjacent the lower end; and means for supplying the liquid to each of a plurality of conduits positioned above said removing means, each connected to the side wall of the tank at one of a plurality of openings spaced relative to each other between the lower end and the minimum liquid level, the plurality of openings being circumferentially spaced at approximately the same vertical position.

2. An apparatus according to claim 1, wherein the means for removing the liquid from the tank comprises a sump pump having a suction inlet and a discharge outlet; and a sump conduit attached at a first end to the sump pump suction inlet and having an inlet end which is located within the tank.

3. An apparatus according to claim 2, wherein the liquid supplying means comprises a header attached between each of the plurality of conduits and the sump pump discharge outlet.

4. An apparatus according to claim 2, wherein the means for supplying oxidization air comprises a plurality of sparge tubes within the tank, each tube connected to an oxidization air source outside the tank.

5. An apparatus according to claim 4, wherein said sparge tubes are located at least 4 feet above the lower end of the tank and below the minimum liquid level.

6. An apparatus according to claim 5, wherein the inlet end of the sump conduit is substantially 2 feet above the lower end of the tank.

7. An apparatus according to claim 4, wherein said sparge tubes are located substantially adjacent the lower end of the tank.

* * * * *